3 Sheets—Sheet 2.

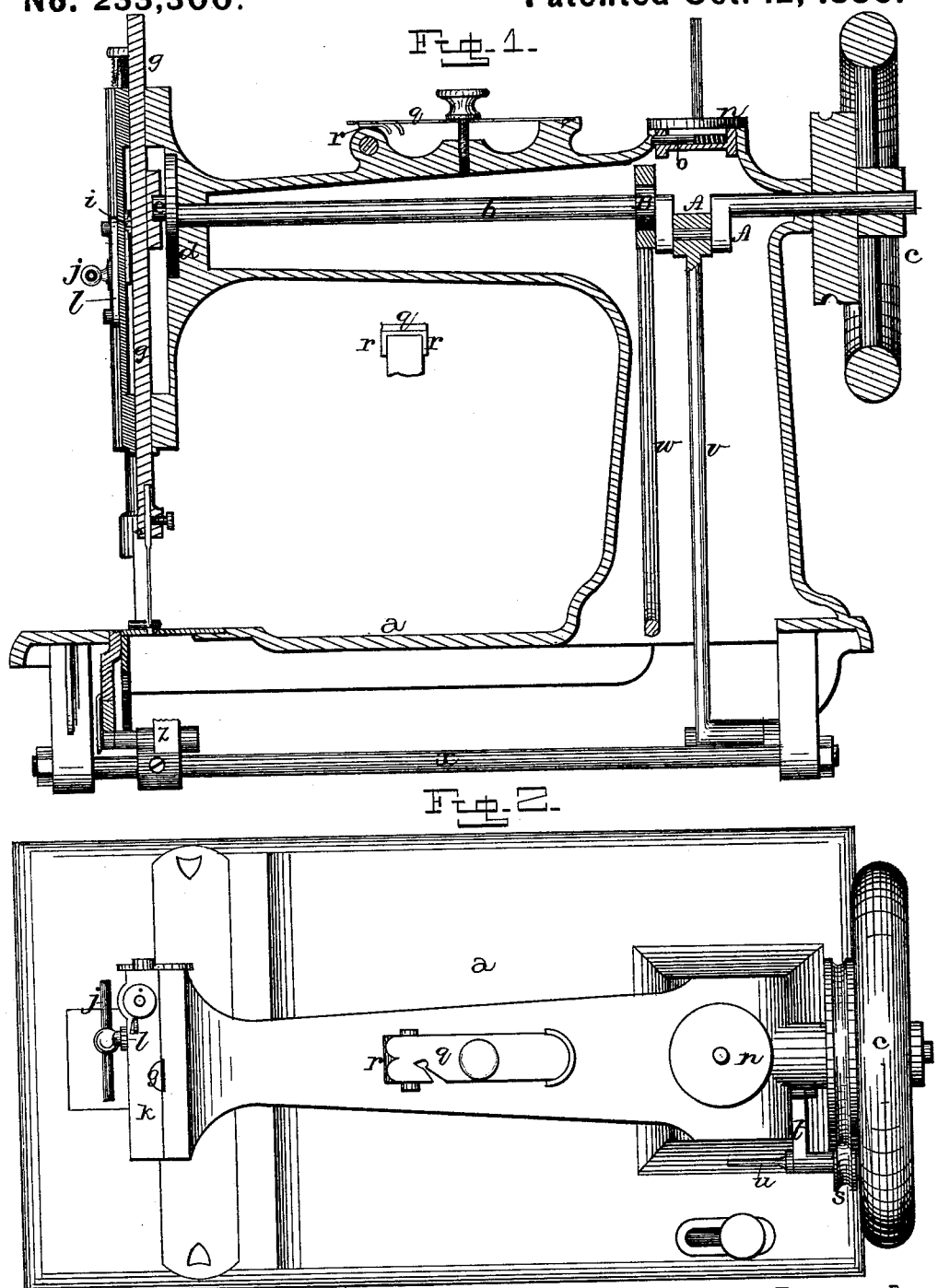

C. H. THURSTON.
Sewing Machine.

No. 233,300.                              Patented Oct. 12, 1880.

3 Sheets—Sheet 3.
C. H. THURSTON.
Sewing Machine.
No. 233,300.  Patented Oct. 12, 1880.
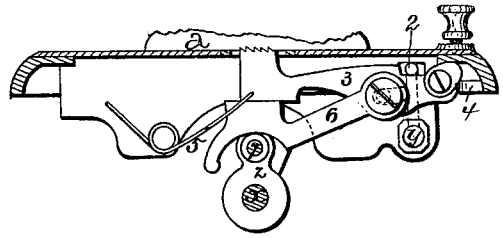
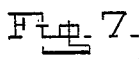
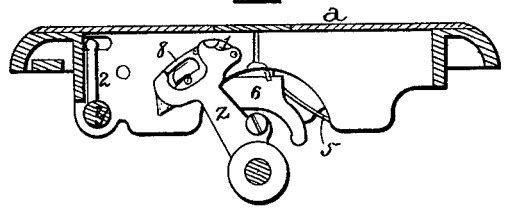
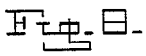
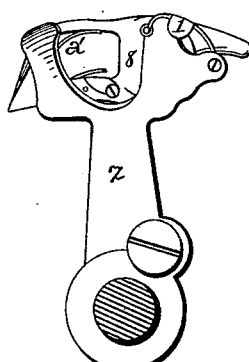
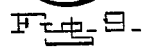
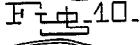
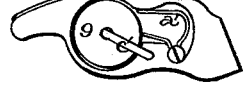
Witnesses:
J. W. Garner
Wm. W. Mortimer
Inventor:
C. H. Thurston,
per
F. A. Lehmann,
atty.

UNITED STATES PATENT OFFICE.

CHARLES H. THURSTON, OF MARLBOROUGH, NEW HAMPSHIRE.

SEWING-MACHINE.

SPECIFICATION forming part of Letters Patent No. 233,300, dated October 12, 1880.

Application filed December 31, 1879.

*To all whom it may concern:*

Be it known that I, CHARLES H. THURSTON, of Marlborough, in the county of Cheshire and State of New Hampshire, have invented certain new and useful Improvements in Sewing-Machines; and I do hereby declare the following to be a full, clear, and exact description of the invention, such as will enable others skilled in the art to which it pertains to make and use it, reference being had to the accompanying drawings, which form part of this specification.

My invention relates to improvements in sewing-machines; and it consists in the arrangement and combination of parts, that will be more fully described hereinafter, whereby a light, easy-running machine is produced.

Figure 3:
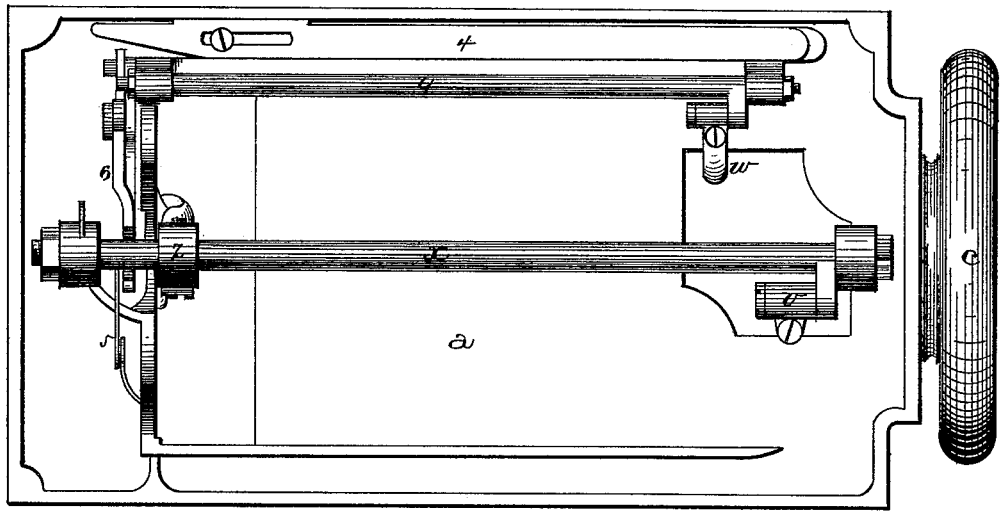
Figure 4:
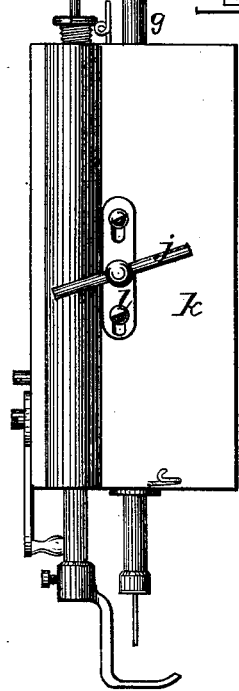
Figure 5:
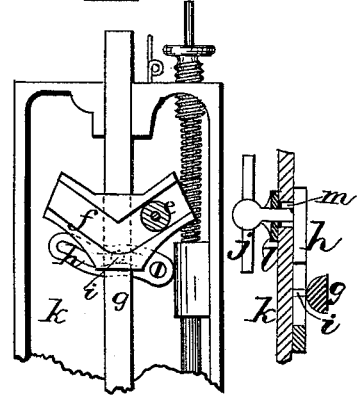

Figure 1 is a vertical section of a machine embodying my invention. Fig. 2 is a plan view, and Fig. 3 is an inverted view, of the same. Fig. 4 is an elevation of the front end of the arm and its attachments. Fig. 5 is a detailed view of the needle-bar and the slotted arm $h$. Fig. 6 shows a side elevation of the mechanism which operates the feed. Fig. 7 is a side view of the shuttle-arm and the parts connected thereto. Fig. 8 is an enlarged view of the shuttle-arm and shuttle. Figs. 9 and 10 are views of the shuttle taken from opposite sides.

$a$ represents the frame of the machine, which may be of any construction desired.

The shaft $b$ has the usual balance-wheel, $c$, on its rear end, and the wheel $d$, having the wrist-pin $e$, on its front end. This pin $e$ engages with the V-shaped cam-groove on the inner side of the plate $f$, which is secured to the inner side of the half-round needle-bar $g$, for the purpose of moving the bar up and down. This bar $g$ is made half-round, so as to prevent it from turning partially around while in operation, as it would be liable to do if round.

On the outer side of the needle-bar is the pin $i$, which catches in and operates the slotted plate $h$, which plate is secured at one end to the end of the pivot of the tubular take-up $j$, and causes the take-up to move through a portion of a circle at every movement of the bar. The pivot of this take-up is not journaled in the detachable part $k$ of the head, but is journaled in the vertically-adjustable plate $l$, that is secured by means of set-screws to the part $k$. Through the part $k$ is made a vertical slot, $m$, through which the pivot of the take-up passes. This pivot has its bearing in the slotted plate $l$, which can be adjusted up and down on the part $k$, so as to raise or lower the take-up in relation to the point of the needle. A tubular form of take-up is used for the reason that the movement is more effective, as it acts at both ends at the same time, and the parts required to operate it are few and simple, and there is no opening through which the oil used for lubrication can get out to dirty the machine and discolor the thread. The lower end of the needle-bar is made round, and the needle is secured in it by means of a set-screw in the usual manner. The presser-foot may be of the usual construction.

Near the rear end of the shaft $b$ are made a crank, A, and an eccentric, B, and just above them is made an opening, into which the spool-holder $n$ is inserted and held by a small spring-catch, $o$, in its under side. By removing this holder access is at once given to the crank and eccentric at any moment, either to lubricate them or to detach the connecting-rods.

From the spool the thread passes through a cut in the side of the spring tension-plate $q$ forward under its end, and between it and the plate $r$, which has its two ends turned downward at right angles, so as to receive the screws which pivot this plate to a projection on top of the arm. This plate $r$ is thus pivoted so as to accommodate itself to the movement of the spring-plate $q$ as the pressure is being regulated by the set-screw, and thus cause an even pressure to be exerted upon the thread for the full length of the plate $r$. This construction being old, no claim is here made for it.

On the inside of the balance-wheel is formed the usual pulley for running a belt, which is to run the small pulley $s$, for winding the bobbin. This pulley is journaled in a pivoted arm, $t$, and the shaft $u$, to which the pulley is secured, extends out far enough on the opposite side of the arm to receive the bobbin or a small spool. After the bobbin has been wound this arm is allowed to drop down out of the way until again needed. This construction being old, no claim is here made for it.

Extending down from the crank A and eccentric B on the shaft $b$ are the two connecting-rods $v$ $w$, one of which imparts a rocking motion to the shaft $x$, that operates the shuttle, and the other to the shaft $y$, which operates the feed. To the shaft $x$, at the end under the needle-bar, is secured the arm $z$, which carries the shuttle, and which arm is provided with a spring-latch, 1, for holding the shuttle in place.

The shaft $y$ has an L-shaped arm, 2, on its front end, which arm bears against a shoulder on the feed-plate 3, and every time that the arm 2 moves toward the shaft $x$ it pushes the feed-plate forward a distance that is regulated by the pointed plate or rod 4, and as the arm moves backward the spring 5, connected to the feed-plate, moves the plate down and backward also. This feed-plate has a slot through it where the pivotal bolt or screw passes through, so that when the regulator 4 is pushed forward its pointed end serves as a stop to keep the feed-plate from moving too far backward, and by moving this regulator back and forth by means of its screw, which projects up through the top of the bed-plate, the stroke of the feed-plate can be regulated at will, so as to feed the material being sewed forward fast or slow. Pivoted upon the same bolt or screw which holds the feed-plate in place is the plate 6, which catches against the under side of the feed-plate for the purpose of raising it upward.

Projecting from the side of the arm $z$ is a smaller arm, 7, which carries a friction-roller on its end, and this roller catches under the plate 6, so that every time the shaft $x$ rocks toward the shaft $y$ this arm 7 raises the plate 6, and this plate 6 raises the feed-plate while it is being forced forward by arm 2, so as to cause the feed-plate to move the material being sewed.

The shuttle 8 is of the form shown, and is hollowed out on its flat side, so as to receive the bobbin 9 and tension-spring $a'$. The bobbin is held in place by an arm, $c'$, which is attached at one end to the shell and extends inward a suitable distance to the center of the bobbin. The spring $a'$ is bent into a U shape, and each end has a cut in it for the thread to catch in, and the longer end of the two presses the thread against the inside wall of the shuttle, so as to give it the proper tension. The spring holding device 1 keeps this shuttle always in place against the needle-plate and prevents the shuttle from flying out of place, or moving in such a manner as not to time properly with the stroke of the needle. No novelty is here claimed for the shuttle.

Having thus described my invention, I claim—

1. In a sewing-machine, the combination of an operating-shaft, a needle-bar provided with a projection, $i$, a slotted plate, $h$, which is operated by the projection, a vertically-adjustable plate, $l$, and a take-up, $j$, which is pivoted in the plate $l$, substantially as shown.

2. The combination of the two rocking shafts $x$ $y$, arms $z$ 7 2, feed-plate 3, spring 5, and plate 6, the parts being arranged to operate substantially as specified.

In testimony that I claim the foregoing I have hereunto set my hand this 16th day of December, 1879.

CHAS. H. THURSTON.

Witnesses:
ELISHA O. WOODWARD,
WM. N. NASON.